(12) United States Patent
Ishitsuka

(10) Patent No.: US 9,066,008 B2
(45) Date of Patent: Jun. 23, 2015

(54) DISPLAY CONTROL APPARATUS AND METHOD FOR CONTROLLING THE SAME

(71) Applicant: CANON KABUSHIKI KAISHA, Tokyo (JP)

(72) Inventor: Yuichiro Ishitsuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/185,800

(22) Filed: Feb. 20, 2014

(65) Prior Publication Data

US 2014/0232924 A1    Aug. 21, 2014

(30) Foreign Application Priority Data

Feb. 21, 2013  (JP) ................... 2013-032107

(51) Int. Cl.
*H04N 5/232* (2006.01)
(52) U.S. Cl.
CPC ....... *H04N 5/23216* (2013.01); *H04N 5/23293* (2013.01)

(58) Field of Classification Search
CPC ................................... H04N 5/23293
USPC ............................ 348/333.12, 333.11, 240.2
See application file for complete search history.

(56) References Cited

FOREIGN PATENT DOCUMENTS

JP          5-145846 A     6/1993

*Primary Examiner* — Joel Fosselman
(74) *Attorney, Agent, or Firm* — Canon USA, Inc., I.P. Division

(57) ABSTRACT

A display control apparatus includes a display control unit configured to display an image in a display region of a display unit in a first display mode for displaying a whole of the image in a state where an area of a part of the image, the area being a processing area of predetermined processing, is identifiable, and in a second display mode for displaying the processing area of the image zoomed according to the display region, and a control unit configured to change, in the first display mode, the processing area by a first movement amount in response to receiving a changing operation, and to change, in the second display mode, the processing area by a second movement amount that is smaller than the first movement amount in response to receiving the changing operation.

24 Claims, 9 Drawing Sheets

DISPLAY CONTROL APPARATUS AND METHOD FOR CONTROLLING THE SAME

BACKGROUND OF THE INVENTION

1. Field of the Invention

The present invention relates to a display control apparatus and a method for controlling the display control apparatus especially when setting, of a whole image, an area on which predetermined processing is to be performed.

2. Description of the Related Art

A device capable of performing trimming processing for clipping, of a whole image, a part of a region specified by a user has become common. Japanese Patent Application Laid-Open No. 5-145846 discusses a method for setting a trimming region while switching between a trimming edition screen for indicating a trimming area with the whole image displayed and a confirmation screen for displaying a trimming image that is an image within the trimming area. However, according to Japanese Patent Application Laid-Open No. 5-145846, on the confirmation screen for displaying the enlarged image of the area to be trimmed, the trimming area cannot be changed.

SUMMARY OF THE INVENTION

The present invention has been made in consideration of the aforementioned problems, and realizes a technique for performing, according to display state, a setting operation of a processing area where predetermined processing is to be performed. By this technique, in both cases where the processing area for the predetermined processing is indicated with a whole image displayed, and where the enlarged processing area is displayed, the setting operation can be performed with a desirable operation feeling suitable for each display state.

According to an aspect of the present invention, a display control apparatus includes a display control unit configured to display an image in a display region of a display unit in a first display mode for displaying a whole of the image in a state where an area of a part of the image, the area being a processing area of predetermined processing, is identifiable, and in a second display mode for displaying the processing area of the image zoomed according to the display region, an operation unit configured to receive a predetermined changing operation for changing the processing area of the image, and a control unit configured to move, in the first display mode, the processing area by a first movement amount in response to receiving the predetermined changing operation, and to move, in the second display mode, the processing area by a second movement amount that is smaller than the first movement amount in response to receiving the predetermined changing operation.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1A:
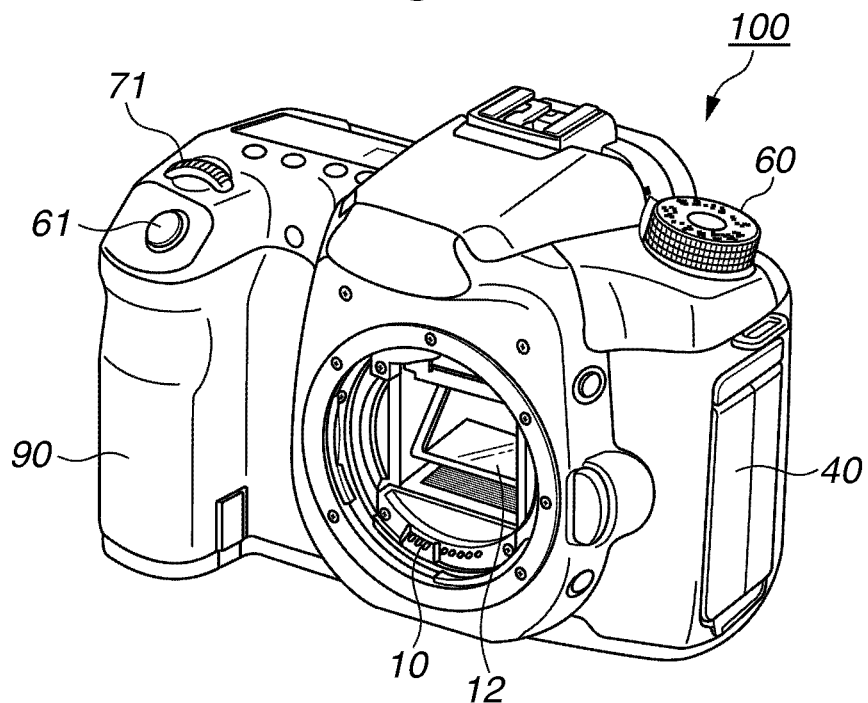
FIGS. 1A and 1B illustrate external views of a digital camera.
Figure 1B:
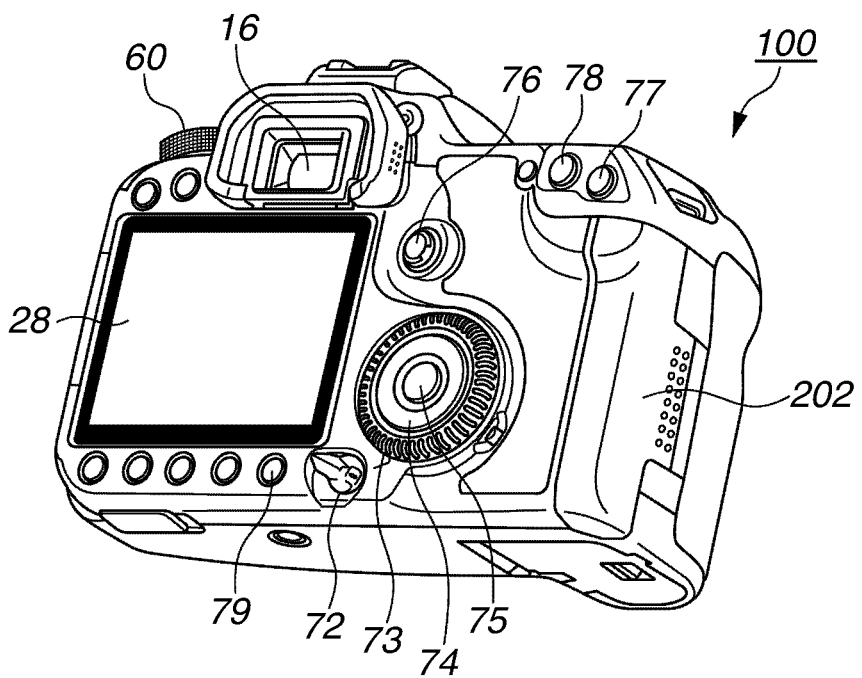
Figure 2:
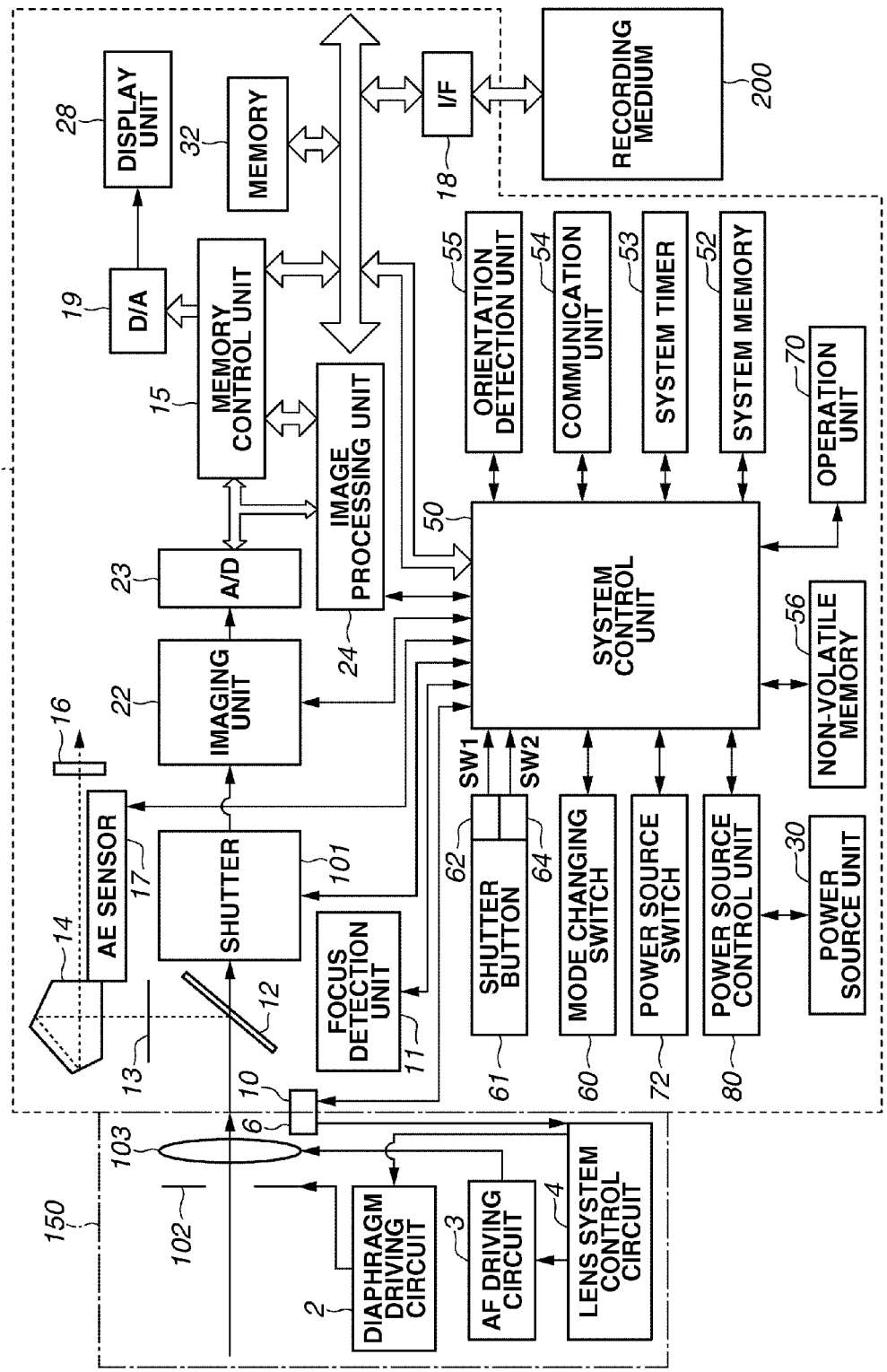
FIG. 2 is a schematic configuration block diagram of the digital camera.

FIGS. 1A and 1B illustrate external views of a digital camera as an example of an imaging apparatus according to an exemplary embodiment of the present invention. FIG. 1A is a front perspective view of a digital camera 100, and FIG. 1B is a rear perspective view thereof. As illustrated in FIG. 1B, the digital camera 100 includes a display unit 28 for displaying an image and various kinds of information. A shutter button 61 is an operation unit for issuing an imaging instruction. A mode changing switch 60 is an operation unit for switching a mode between various types of modes. A terminal cover 40 protects a connector (not illustrated) of a connection cable for connecting an external device with the digital camera 100. A main electronic dial 71 is a rotating operation member included in an operation unit 70 (FIG. 2). By rotating the main electronic dial 71, setting values of a shutter speed and a diaphragm can be changed. A power source switch 72 is an operation member for switching a power source of the digital camera 100 on and off. A sub electronic dial 73 is a rotating operation member included in the operation unit 70. The sub electronic dial 73 can move a selection frame and advance images. An arrow key 74 is included in the operation unit 70 and is a four-directional key that can be pressed in each of up, down, right and left portions. An operation corresponding to a pressed portion of the arrow key 74 can be performed. A set button 75 is included in the operation unit 70, is a press button, and is mainly used for determining a selection item. A live view (LV) button 76 is included in the operation unit 70 and switches a live view (hereinafter, referred to as "LV") on and off in a still image shooting mode. In a moving image shooting mode, the LV button 76 is used to issue an instruction to start and stop shooting (recording) a moving image. An enlargement button 77 is included in the operation unit 70, and is an operation button for switching an enlargement mode on and off in a LV display of the shooting mode, and for changing an enlargement ratio in the enlargement mode. In a reproduction mode, the enlargement button 77 enlarges a reproduced image, thereby increasing the enlargement ratio. A reduction button 78 is included in the operation unit 70, lowers the enlargement ratio of the enlarged reproduced image, thereby reducing the displayed image. A reproduction button 79 is included in the operation unit 70, and is an operation button for switching a mode between the shooting mode and the reproduction mode. In the shooting mode, the reproduction button 79 is pressed to switch the mode to the reproduction mode, and then a newest image, of the images recorded in a recording medium 200, can be displayed on the display unit 28. A quick return mirror 12 is moved up and down by an actuator (not illustrated) according to an instruction by a system control unit 50 (FIG.

2). A communication terminal 10 is used when the digital camera 100 communicates with a microcomputer of a lens unit (removable). An eyepiece finder 16 is a finder of a look-in type for checking a focal point and a composition of an optical image of an object obtained through a lens unit 150 by observing a focusing screen 13. A cap 202 is a cap of a slot storing the recording medium 200. A grip unit 90 is a holding portion having a shape to be easily grasped with a user's right hand when the user holds the digital camera 100 to capture an image.

FIG. 2 is a block diagram illustrating a configuration example of the digital camera 100 according to a first exemplary embodiment. As illustrated in FIG. 2, the lens unit 150 is an interchangeable photographic lens unit detachably mounted on the digital camera 100.

A lens 103 typically includes a plurality of lenses, which are simplified herein, and only one lens is illustrated. A communication terminal 6 is used when the lens unit 150 communicates with a microcomputer of the digital camera 100. The communication terminal 10 is used when the digital camera 100 communicates with the microcomputer of the lens unit 150. The lens unit 150 communicates with the system control unit 50 via the communication terminals 6 and 10, and controls a diaphragm 102 by a lens system control circuit 4 located inside the lens unit 150 via a diaphragm driving circuit 2 and changes the position of the lens 103 via an auto focus (AF) driving circuit 3 to focus the lens 103.

An automatic exposure (AE) sensor 17 performs photometry of brightness of the object via the lens unit 150.

A focus detection unit 11 outputs information about a defocus amount to the system control unit 50. Based on the information, the system control unit 50 controls the lens unit 150 to perform phase difference AF.

The quick return mirror 12 (hereinafter, referred to as a "mirror 12") is moved up and down by the actuator (not illustrated) according to the instruction from the system control unit 50 when exposure, LV shooting, and moving image shooting are performed. The mirror 12 switches light flux incident from the lens 103 between a side of the eyepiece finder 16 and a side of an imaging unit 22. The mirror 12 is usually disposed to reflex and guide the light flux to the eyepiece finder 16. However, when the image is captured or in the case of the LV display, the mirror 12 is moved upward and retracted from the light flux to guide the light flux to the imaging unit 22 (mirror is moved upward). Further, the mirror 12 is a half mirror so that a part of the light passes through a center portion of the mirror 12, and a part of the light flux passes through the center portion thereof to enter the focus detection unit 11 to detect a focal point.

A photographer observes the focusing screen 13 through a pentaprism 14 and the eyepiece finder 16 to check the focal point and the composition of the optical image of the object obtained through the lens unit 150.

A shutter 101 is a focal plane shutter capable of freely controlling an exposure time of the imaging unit 22 under the control of the system control unit 50.

The imaging unit 22 is an image sensor including a charge coupled device (CCD) sensor or a complementary metal-oxide semiconductor (CMOS) sensor for converting the optical image into electrical signals. An analog-to-digital (A/D) convertor 23 converts an analog signal into a digital signal. The A/D converter 23 is used to convert the analog signal output from the imaging unit 22 into the digital signal.

An image processing unit 24 performs resizing processing such as predetermined pixel interpolation and reduction, and color conversion processing on data from the A/D converter 23 or data from a memory control unit 15. Further, the image processing unit 24 performs a predetermined calculation processing using captured image data, and the system control unit 50 performs, based on the obtained calculation result, exposure control and focusing control. With this arrangement, AF processing of a through-the-lens (TTL) method, AE processing, and electronic flash pre-emission (EF) processing are performed. The image processing unit 24 further performs predetermined calculation processing using the captured image data, and automatic white balance (AWB) processing of the TTL method is also performed based on the obtained calculation result.

Output data from the A/D converter 23 is written into a memory 32 via the image processing unit 24 and the memory control unit 15, or only via the memory control unit 15. The memory 32 stores the image data obtained by the imaging unit 22 and converted into the digital data by the A/D converter 23, and the image data to be displayed on the display unit 28. The memory 32 has a storage capacity sufficient for storing a predetermined number of still images, and moving images and audio data for a predetermined time.

Further, the memory 32 also functions as a memory (video memory) for displaying an image. A digital-analog (D/A) convertor 19 converts data for displaying an image stored in the memory 32 into an analog signal to supply the converted data to the display unit 28. As described above, the image data to be displayed, the data being written into the memory 32, is displayed on the display unit 28 via the D/A converter 19. The display unit 28 performs display corresponding to the analog signal from the D/A converter 19 on a display device such as a liquid crystal display (LCD). The digital signal once converted from the analog signal by the A/D converter 23 and stored in the memory 32 is converted into the analog signal by the D/A converter 19, sequentially transferred to the display unit 28 to be displayed. Thus, the display unit 28 functions as an electronic view finder to perform through image display (the LV display).

A non-volatile memory 56 is an electrically erasable and recordable memory, such as an electrically erasable programmable read-only memory (EEPROM). The non-volatile memory 56 stores constants and a program for causing the system control unit 50 to operate. The program referred herein is a program for performing various processing of flowcharts described below in the present exemplary embodiment.

The system control unit 50 controls the entire digital camera 100. By executing the program recorded in the non-volatile memory 56 described above, each process according to the present exemplary embodiment described below can be realized. A system memory 52 adopts a random access memory (RAM). The system memory 52 expands constants, variables, and the program read from the non-volatile memory 56 for causing the system control unit 50 to operate. Further, the system control unit 50 controls the memory 32, the D/A converter 19, and the display unit 28 to control the display.

A system timer 53 is a time measuring unit for measuring a time used for various types of control operations and a time of a built-in clock.

The mode changing switch 60, a first shutter switch 62, a second shutter switch 64, and the operation unit 70 are operation units for inputting various types of operation instructions to the system control unit 50.

The mode changing switch 60 switches an operation mode of the system control unit 50 to any of a still image recording mode, a moving image recording mode, and the reproduction mode. The still image recording mode includes an automatic shooting mode, an automatic scene discrimination mode, a manual mode, an aperture priority mode (aperture value (Av) mode), and a shutter speed-priority shooting mode (time value (Tv) mode). The still image recording mode further includes various types of scene modes for setting a shooting mode depending on each shooting scene, a program AE mode, and a custom mode. The mode changing switch 60 can directly switches the operation mode to any of the above described modes included in the still image shooting mode. Or, after the operation mode is once switched to the still image shooting mode with the mode changing switch 60, the operation mode may be switched to any of the above described modes included in the still image shooting mode using other operation members. Similarly, the moving image shooting mode may include a plurality of modes. When the shutter button 61 included in the digital camera 100 is half-pressed (shooting preparation instruction), in other words, during an operation of the shutter button 61, the first shutter switch 62 turns on to generate a first shutter switch signal SW1. In response to the first shutter switch signal SW1, operations of the AF processing, the AE processing, the AWB processing, and the EF processing are started.

When the shutter button 61 is fully-pressed (shooting instruction), in other words, the operation of the shutter button 61 is completed, the second shutter switch 64 turns on to generate a second shutter switch signal SW2. In response to the second shutter switch signal SW2, the system control unit 50 starts a series of operations of shooting processing from reading a signal from the imaging unit 22 up to writing image data into the recording medium 200.

A function is appropriately allocated to each of operation members of the operation unit 70 for each scene by selecting various types of function icons displayed on the display unit 28, and the operation members function as various types of function buttons. The function buttons include an end button, a return button, an image-advancing button, a jump button, a diaphragm closing button, and an attribute changing button. For example, when a menu button is pressed, a menu screen where various types of settings can be made is displayed on the display unit 28. A user can intuitively make various types of settings using the menu screen displayed on the display unit 28, a four-direction button of up, down, right, and left, and a set button.

The operation unit 70 includes various types of operation members serving as input units that receive instructions from the user. The operation unit 70 at least includes the following operation units: the shutter button 61, the main electronic dial 71, the power source switch 72, the sub electronic dial 73, the arrow key 74, the set button 75, the LV button 76, the enlargement button 77, the reduction button 78, and the reproduction button 79.

A power source control unit 80 includes a battery detection circuit, a direct current (DC)-DC converter, and a switch circuit for switching blocks to be energized, and detects a battery mounted, a type of the battery, and a remaining amount thereof. Further, the power source control unit 80 controls the DC-DC converter based on a detection result and an instruction from the system control unit 50 to supply required voltage to each unit including the recording medium 200 for a required period.

A power source unit 30 includes a primary battery such as an alkaline battery and a lithium battery, a secondary battery such as a nickel-cadmium (NiCd) battery, a nickel-metal hydride (NiMH) battery, and a lithium (Li) battery, and an alternating-current (AC) adopter. A recording medium interface (I/F) 18 is an interface between the digital camera 100 and the recording medium 200 such as a memory card and a hard disk. The recording medium 200, which can be a memory card for recording the captured image, includes a semiconductor memory or a magnetic disk.

A communication unit 54 is connected with an external device via wireless communication or a wired cable to transmit and receive a video signal and an audio signal. The communication unit 54 can be connected with a wireless local area network (LAN) or an internet. The communication unit 54 can transmit the image (including a through image) captured by the imaging unit 22 and the image recorded in the recording medium 200, and also receive the image data and other various types of information from the external device.

An orientation detection unit 55 detects an orientation of the digital camera 100 with respect to a gravitational direction. Based on the orientation detected by the orientation detection unit 55, it can be determined whether the image captured by the imaging unit 22 is captured with the digital camera 100 held laterally or longitudinally. The system control unit 50 can add orientation information corresponding to the orientation detected by the orientation detection unit 55 to an image file of the image captured by the imaging unit 22 or record a rotated image. As the orientation detection unit 55, an acceleration sensor or a gyro sensor can be used.

Operations of the display control apparatus having the above described configurations will be described below.

When the image data to be trimmed is displayed by the user's operation, the compressed image data stored in the recording medium 200 is extended to normal data for each pixel via the memory control unit 15, and the extended data is transferred to the memory 32 to be displayed on the display unit 28.

The size of an area to be trimmed of the displayed image can be changed by the enlargement button 77 or the reduction button 78, and the position of the area to be trimmed can be changed by the arrow key 74. When the set button 75 is pressed, the image of the specified area and position is displayed as a preview, and a saving confirmation screen is displayed. When the saving is confirmed, a new image is created and saved in the recording medium 200.

Figure 3A:
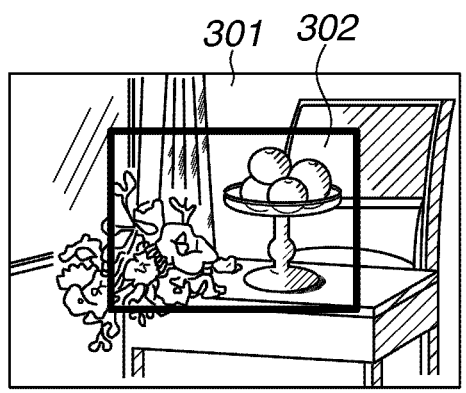
FIG. 3A illustrates a display example of a trimming area setting screen in a whole-image display.

FIG. 3A illustrates a display example of a trimming area setting screen in a whole-image display on the display unit 28. The display state when the trimming area is set is referred to as a whole-image display mode hereinafter. The display unit 28 displays a whole portion of an image 301 to be trimmed. A frame 302 indicates the trimming area. In the present exemplary embodiment, the example displaying the frame is illustrated. However, other display forms may be used as long as the trimming area can be identifiably displayed. For example, a broken line and a display item indicating only a top portion of the trimming area may be displayed. Further, the display form may be changed between an inside or outside of the trimming area, for example, the outside of the trimming area is displayed in a gray scale and the inside thereof is displayed in full color. The system control unit 50 reduces the frame 302 (i.e., narrows down the trimming area) in response to the enlargement button 77 being pressed. On the other hand, in response to the reduction button 78 being pressed, the system control unit 50 enlarges the frame 302 (i.e., widens the trimming area). Further, the system control unit 50 moves the frame 302 up, down, right, and left on the image 301 according to user's operation with the arrow key 74. In the whole-image display mode, since the whole image to be trimmed is displayed, information about an outside surrounding area of the trimming area (outside the frame 302) can be grasped. Therefore, the trimming area can be adjusted while checking whether an object to be included in the trimming area goes beyond the current frame 302 for the trimming. On the other hand, since a portion to be trimmed (inside the frame 302) is displayed smaller than a whole display screen of the display unit 28, and since the outside of the portion to be trimmed can also be viewed, it is difficult to imagine the image obtained as a result of trimming.

Figure 3B:
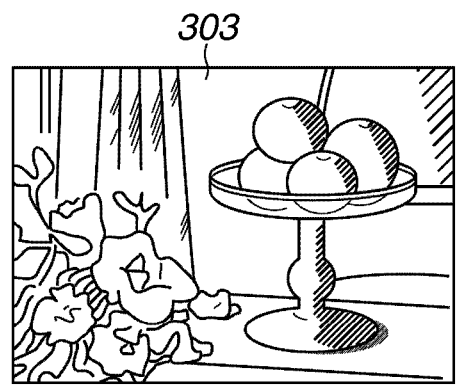
FIG. 3B illustrates a display example of the trimming area setting screen in a trimming area display.

FIG. 3B illustrates a display example of the trimming area setting screen in a trimming area display on the display unit 28. The display state when the trimming area is set is hereinafter referred to as a trimming area display mode, which is differentiated from the whole-image display mode described above. A partial image 303 displayed is obtained by zooming an area of the part of the whole image 301 according to a display region of the display unit 28, and corresponds to an inside portion of the frame 302 illustrated in FIG. 3A. In response to the enlargement button 77 being pressed by the user, the system control unit 50 enlarges the image displayed on the display unit 28 (reduces the area of the image 301 relative to the whole image, in other words, reduces the frame 302, thereby narrowing down the trimming area). On the other hand, in response to the reduction button 78 being pressed by the user, the system control unit 50 reduces the image displayed on the display unit 28 (enlarges the area of the image 301 relative to the whole image, in other words, enlarges the frame 302, thereby increasing the trimming area). Further, in response to the arrow key 74 being pressed, the system control unit 50 moves (scrolls) the display area in a direction of the pressed key. More specifically, when a right button of the arrow key 74 is pressed, an area at the right side of the partial image 303 currently displayed is displayed (the displayed portion is moved left). Since the image displayed in the trimming area display mode is similar to or the same as the image obtained as a result of the trimming, the image obtained by the trimming can be easily imagined. On the other hand, since the outside area of the image 301 to be trimmed is not displayed, information about the outside of the trimming area cannot be grasped, and thus it cannot be checked whether other objects to be included in the trimming area exist in the image 301.

When the trimming area is specified, the whole-image display mode illustrated in FIG. 3A and the trimming area display mode illustrated in FIG. 3B can be changed from each other by a display switching button included in the operation unit 70.

Figure 4A:
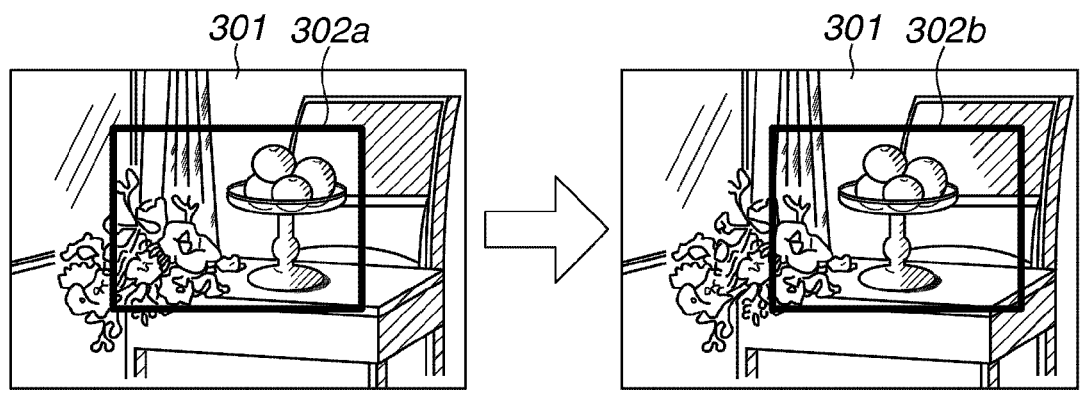
FIG. 4A illustrates a movement of a trimming area with one operation in a whole-image display mode.

FIG. 4A illustrates a movement when the right button of the arrow key 74 is once pressed in the whole-image display mode. According to the present exemplary embodiment, an amount of one movement of the frame (trimming area) in the whole-image display mode is defined as an amount corresponding to 1.5% of the number of pixels in a movement direction. For example, in the case of the number of recording pixels of the image to be trimmed (image before the trimming) being 4,000 pixels (in a lateral direction)×3,000 pixels (in a longitudinal direction), when the right button is once pressed, the image is moved in the lateral direction. Therefore, the image is moved right by an amount corresponding to 60 pixels, which is 1.5% of the number of pixels (4,000 pixels) in the lateral direction. More specifically, the frame is moved right by the amount corresponding to 1.5% of the number of recording pixels in the lateral direction of the image 301 from a frame 302a in a display example on the left side in FIG. 4A illustrating the frame before being moved to a frame 302b in a display example on the right side in FIG. 4A illustrating the moved frame.

Figure 4B:
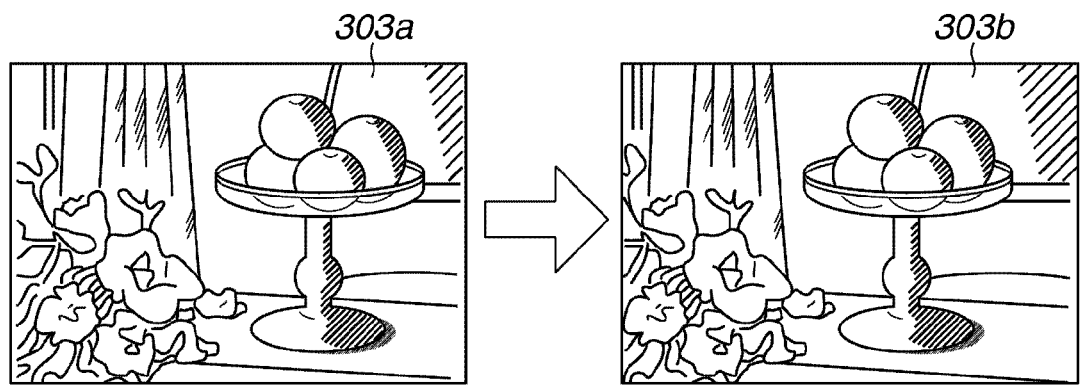
FIG. 4B illustrates a movement of the trimming area with one operation in a trimming area display mode.

FIG. 4B illustrates a movement when the right button of the arrow key 74 is once pressed in the trimming area display mode. An amount of one movement in the display area (trimming area) in the trimming area display mode is defined as a minimum movement unit (a predetermined value defined by the number of recording pixels before the trimming target image is trimmed, for example, an amount corresponding to four pixels). Further, the movement amount of one unit when a direction button is pressed long is defined as an amount corresponding to five times as much as a minimum movement unit: (an amount corresponding to 20 pixels when the minimum movement unit is four pixels). For example, for any number of recording pixels of the image to be trimmed (image before being trimmed), when the right button is once pressed short, the frame is moved right by an amount corresponding to four pixels, which is the minimum movement unit. The minimum movement unit described above is set smaller than an amount of one movement (60 pixels when 4,000 pixels×3,000 pixels in the lateral and longitudinal directions, respectively) of the frame (trimming area) in the whole-image display mode. More strictly, relationship in size varies depending on the number of recording pixels of the image. However, the number of pixels corresponding to 1.5% of the number of recording pixels becomes smaller than four pixels only if the number of recording pixels in the longitudinal direction or the lateral direction becomes smaller than 267 pixels. The minimum number of pixels of the images that can be captured by the digital camera 100 according to the present exemplary embodiment is 640 (in the lateral direction)×480 pixels (in the longitudinal direction). In other words, as long as the image is captured by the digital camera 100, the amount of the one movement in the trimming area in the trimming area display mode always becomes smaller than that in the whole-image display mode. Further, the amount corresponding to five times as much as the minimum movement unit is smaller than the amount of the one movement of the frame in the whole-image display mode. However, the above described numeral conditions may not be satisfied in the cases where the image is further reduced by trimming or resizing, or obtained by the external device.

As described above, according to the exemplary embodiments of the present invention, it is focused on that accuracy for adjusting the trimming area may be different for each user between the whole-image display mode and the trimming area display mode, and thus a change amount of the trimming area to be adjusted by the same operation is varied. More specifically, in the trimming area display mode, since the image is displayed larger and looks more similar to the result of the trimming, the user may desire finer adjustment as compared with the whole-image display mode. According to the exemplary embodiments of the present invention, in the trimming area display mode, the change amount of the trimming area adjusted by one operation is reduced as compared with the whole-image display mode so that fine adjustment of the trimming area can be performed. On the other hand, in the whole-image display mode, a change amount of the trimming area adjusted by the one operation is increased as compared with the trimming area display mode so that rough adjustment of the trimming area can be performed. More specifically, in response to one changing operation in the whole-image display mode, a trimming processing area is changed by a first change amount (a first movement amount). On the other hand, in response to the one changing operation in the trimming area display mode, the trimming processing area is changed by a second change amount (a second movement amount), which is smaller than the first movement amount. The user separately uses the two specification methods to perform the operation for setting a desired area in the whole image as the trimming area more swiftly with the rough adjustment or more accurately with the fine adjustment. The movement amount when the arrow key 74 is pressed long may be the same as or more than the amount thereof when the arrow key 74 is once pressed.

Figure 5:
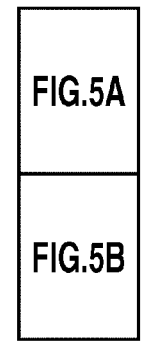
FIG. 5, which is composed of FIGS. 5A and 5B, is a flowchart illustrating trimming area setting processing.
Figure 5A:
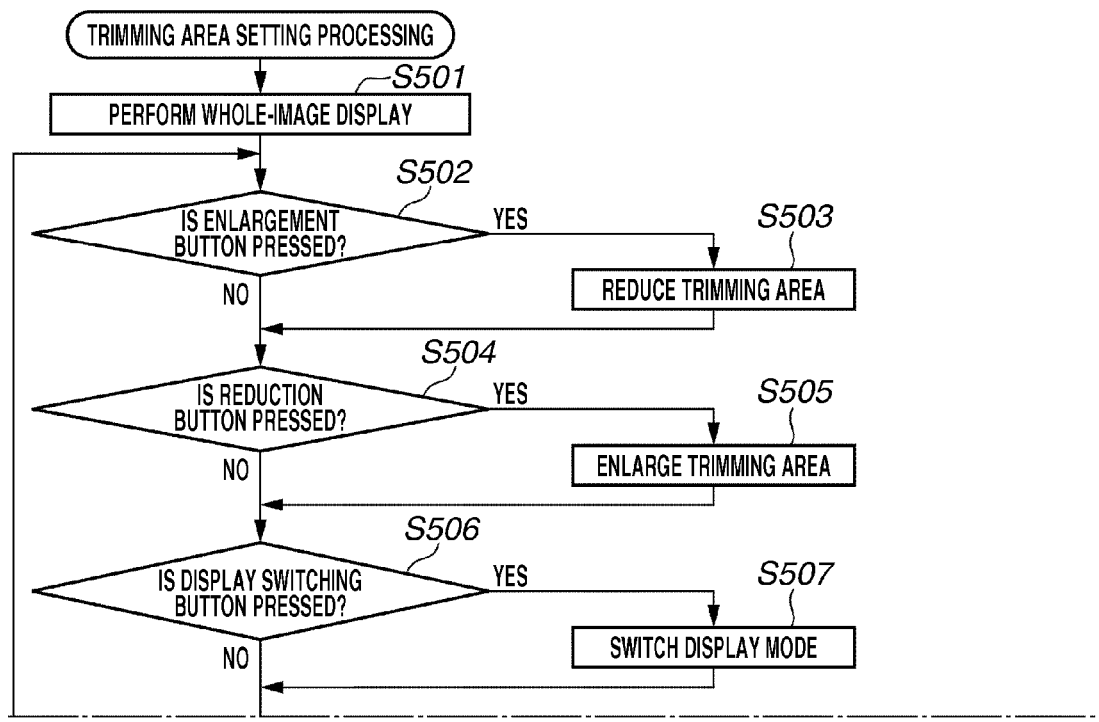
Figure 5B:
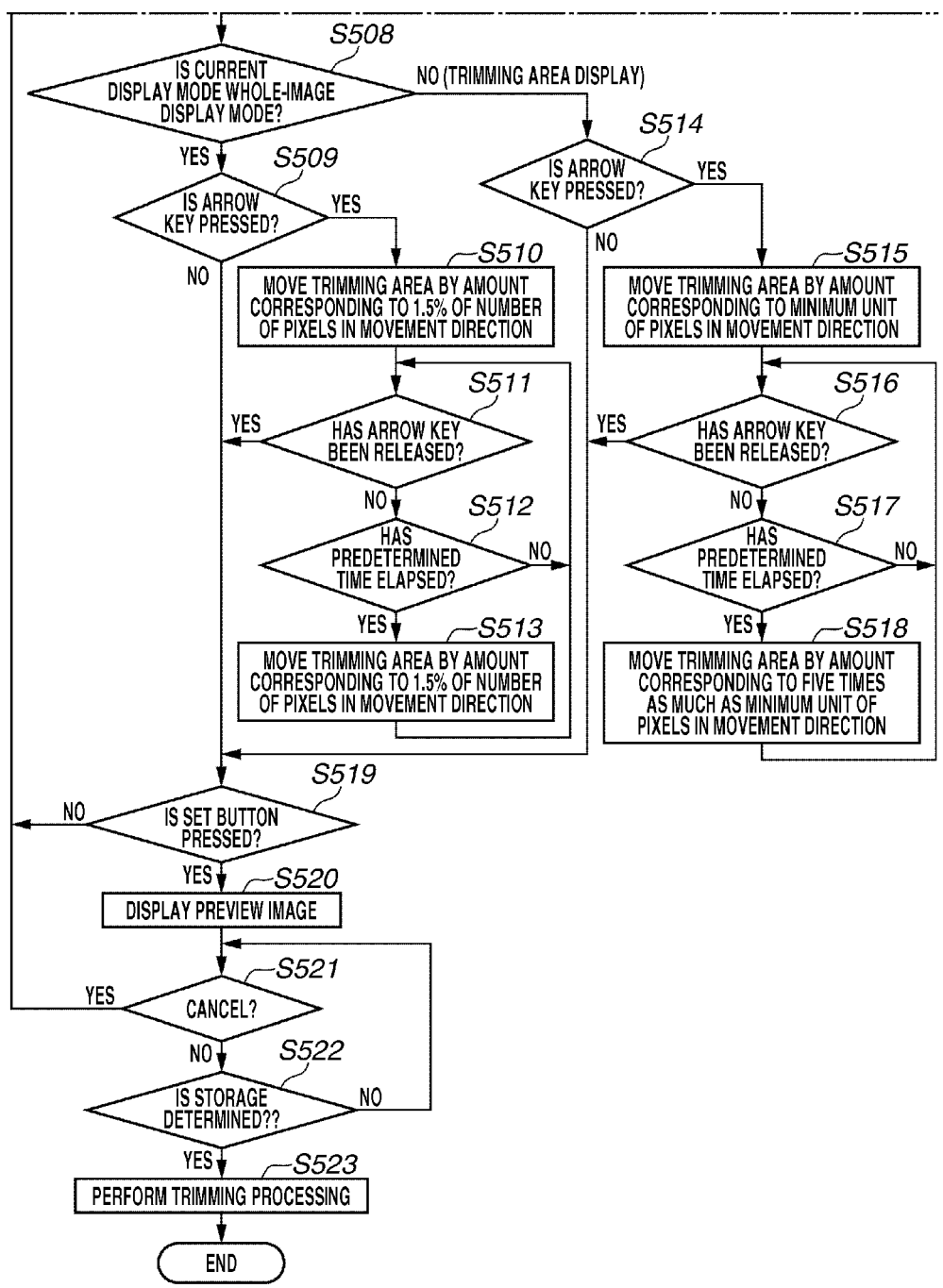

FIG. 5, which is composed of FIGS. 5A and 5B, is a flowchart illustrating trimming area setting processing according to the exemplary embodiments of the present invention. The processing can be realized when the program recorded in the non-volatile memory 56 is expanded in the system memory 52 and executed by the system control unit 50.

When the digital camera 100 is activated in the reproduction mode, and a trimming starting operation is performed with a desired image displayed, processing illustrated in FIG. 5 is started.

In step S501, the system control unit 50 reads the image 301 to be trimmed from the recording medium 200 and displays the image 301 in the whole-image display mode on the display unit 28. More specifically, the system control unit 50 displays the whole image 301 on the display unit 28, and displays the frame 302 being superimposed on the image 301, the frame 302 indicating the trimming area. The frame 302 is displayed in a predetermined initial size at a center of the image (position where a center of the frame 302 and a center of the image 301 correspond each other). FIG. 3A illustrates a display example illustrating the state described above. The image 301 can be an image captured by the imaging unit 22. At this point, since the trimming area setting processing has just started, a guide for indicating that the trimming area can be set in the trimming area display mode may be displayed for the user for a predetermined time or until a certain operation is started. For example, a dialog message indicating "fine adjustment: display switching button" is superimposed on the image 301 to be displayed. With this arrangement, the user can switch the display from the whole-image display mode to the trimming area display mode by pressing the display switching button, and can adjust the trimming area more finely.

In step S502, the system control unit 50 determines whether the enlargement button 77 for changing a size of the trimming area has been pressed. When the system control unit 50 determines that the enlargement button 77 has been pressed (YES in step S502), the processing proceeds to step S503. When the system control unit 50 determines that the enlargement button 77 has not been pressed (NO in step S502), the processing proceeds to step S504.

In step S503, the system control unit 50 reduces (narrows down) the trimming area in response to the enlargement button 77 being pressed. In other words, the frame 302 is reduced in the whole-image display mode while the displayed image is enlarged in the trimming area display mode. The information about the reduced trimming area is stored in the system memory 52.

In step S504, the system control unit 50 determines whether the reduction button 78 for changing the size of the trimming area has been pressed. When the system control unit 50 determines that the reduction button 78 has been pressed (YES in step S504), the processing proceeds to step S505. When the system control unit 50 determines that the reduction button 78 has not been pressed (NO in step S504), the processing proceeds to step S506.

In step S505, the system control unit 50 enlarges (widens) the trimming area in response to the reduction button 78 being pressed. In other words, the frame 302 is enlarged in the whole-image display mode while the displayed image is reduced in the trimming area display mode. The information about the enlarged trimming area is stored in the system memory 52.

In step S506, the system control unit 50 determines whether the display switching button included in the operation unit 70 has been pressed. When the system control unit 50 determines that the display switching button has been pressed (YES in step S506), the processing proceeds to step S507. When the system control unit 50 determines that the switching button has not been pressed (NO in step S506), the processing proceeds to step S508.

In step S507, the system control unit 50 switches the display mode of the trimming area setting processing. More specifically, when the whole-image display mode has been set before the display switching button is pressed, the mode is switched to the trimming area display mode (display example of the trimming area display mode illustrated in FIG. 3B). On the other hand, when the trimming area display mode has been set before the display switching button is pressed, the mode is switched to the whole-image display mode (display example of the whole-image display mode illustrated in FIG. 3A). Before and after the display mode is switched, based on the information about a current trimming area stored in the system memory 52, the frame 302 (in the case of the whole-image display mode) or the partial image 303 (in the case of the trimming area display mode) is displayed to indicate the same trimming area.

In step S508, the system control unit 50 determines whether a current display mode is the whole-image display mode. When the system control unit 50 determines that the current display mode is the whole-image display mode (YES in step S508), the processing proceeds to step S509. When the system control unit 50 determines that the current display mode is not the whole-image display mode, in other words, it is the trimming area display mode (NO in step S508), the processing proceeds to step S514.

In step S509, the system control unit 50 determines whether the arrow key 74 for changing the position of the trimming area has been pressed. When the system control unit 50 determines that the arrow key 74 has been pressed (YES in step S509), the processing proceeds to step S510. When the system control unit 50 determines that the arrow key 74 has not been pressed (NO in step S509), the processing proceeds to step S519.

In step S510, the system control unit 50 moves the trimming area in a pressed direction of the arrow key 74 by the amount corresponding to 1.5% of the number of recording pixels of the image to be trimmed (image 301) in the movement direction based on the pressed direction of the arrow key 74. The specific example is described above. The moved trimming area is stored in the system memory 52.

In step S511, the system control unit 50 determines whether the arrow key 74 has been released. When the system control unit 50 determines that the arrow key 74 has been released (YES in step S511), the processing proceeds to step S519. When the system control unit 50 determines that the arrow key 74 has not been released (NO in step S511), the processing proceeds to step S512.

In step S512, the system control unit 50 determines whether, after the arrow key 74 had been pressed, a predetermined time (e.g., 300 msec) has elapsed since the trimming area has been lastly moved. When the system control unit 50 determines that the predetermined time has elapsed (YES in step S512), the processing proceeds to step S513. When the system control unit 50 determines that the predetermined time has not elapsed (NO in step S512), the processing returns to step S511.

In step S513, the system control unit 50 moves the trimming area in a similar manner to the processing in step S510. The moved trimming area is stored in the system memory 52.

More specifically, when any direction button of the arrow key 74 is kept pressing, the trimming area is moved by the amount corresponding to 1.5% of the number of pixels of the recording pixels in the movement direction for each predetermined time.

On the other hand, in step S514, the system control unit 50 determines whether the arrow key 74 has been pressed. When the system control unit 50 determines that the arrow key 74 has been pressed (YES in step S514), the processing proceeds to step S515. When the system control unit 50 determines that the arrow key 74 has not been pressed (NO in step S514), the processing proceeds to step S519.

In step S515, the system control unit 50 moves the trimming area by the amount corresponding to the minimum movement unit of pixels (e.g., an amount corresponding to four pixels of the recording pixels of the image to be trimmed) in the pressed direction of the arrow key 74. A specific example is described above. The moved trimming area is stored in the system memory 52. Herein, for any number of pixels of the image in the displayed trimming area, the trimming area is moved by the amount corresponding to the minimum movement unit of pixels. More specifically, for any number of recording pixels of the image, any size of the trimming area, and any magnification ratio when the magnification of the image in the trimming area is varied according to the display region, the trimming area is moved by a certain amount (amount corresponding to the minimum movement unit of the pixels).

In step S516, the system control unit 50 determines whether the arrow key 74 has been released. When the system control unit 50 determines that the arrow key 74 has been released (YES in step S516), the processing proceeds to step S519. When the system control unit 50 determines that the arrow key 74 has not been released, in other words, the arrow key 74 is continuously being pressed (NO in step S516), the processing proceeds to step S517.

In step S517, the system control unit 50 determines, after the arrow key 74 had been pressed, whether the predetermined time (e.g., 300 msec) has elapsed since the trimming area has been lastly moved. When the system control unit 50 determines that the predetermined time has elapsed (YES in step S517), the processing proceeds to step S518. When the system control unit 50 determines that the predetermined time has not elapsed (NO in step S517), the processing returns to step S516.

In step S518, the system control unit 50 moves the trimming area by the amount corresponding to five times as much as the minimum movement unit of the pixels (e.g., an amount corresponding to 20 pixels of the recording pixels of the image to be trimmed) in the pressed direction of the arrow key 74. The moved trimming area is stored in the system memory 52. More specifically, when any direction button of the arrow key 74 is kept pressing, the trimming area is moved by the amount corresponding to 20 pixels of the recording pixels in the movement direction for each predetermined time.

In step S519, the system control unit 50 determines whether the set button 75 has been pressed. When the system control unit 50 determines that the set button 75 has been pressed (YES in step S519), the processing proceeds to step S520. When the system control unit 50 determines that the set button 75 has not been pressed (NO in step S519), the processing returns to step S502.

In step S520, the system control unit 50 displays a preview image as a saving confirmation screen, and also displays options for asking the user whether the trimming may be performed based on the currently set trimming area. The preview image is obtained by zooming such that a partial image of the image 301 indicated by the trimming area (the area set by the trimming area setting operation so far) stored in the system memory 52 can be displayed on a whole portion of the display unit 28. In other words, the preview image is displayed in the same manner as the image displayed in the trimming area display mode.

In step S521, the system control unit 50 determines whether the option of "cancel" has been selected and determined in the saving confirmation screen after the preview image had been displayed. The system control unit 50 determines that "cancel" has been selected and determined when, of "cancel" and "save and confirm" that are the options displayed with the preview image, "cancel" has been selected in response to the operation of the arrow key 74, and the set button 75 has been pressed. When "cancel" has been selected and determined (YES in step S521), the processing returns to step S502. When "cancel" has not been selected (NO in step S521), the processing proceeds to step S522.

In step S522, the system control unit 50 determines whether, on the saving confirmation screen, the option of "save and confirm" has been selected and determined. The system control unit 50 determines that "save and confirm" has been selected and determined when, of "cancel" and "save and confirm" that are the options displayed with the preview image, "save and confirm" has been selected in response to the operation of the arrow key 74 and the set button 75 has been pressed. When the system control unit 50 determines that "save and confirm" has been selected and determined (YES in step S522), the processing proceeds to step S523. When the system control unit 50 determines that "save and confirm" has not been selected (NO in step S522), the processing returns to step S521.

In step S523, the system control unit 50 performs the trimming processing to record the image obtained by the trimming as a new image file. More specifically, the system control unit 50 performs the trimming processing on the image 301 to obtain the trimmed image of the portion indicated by the trimming area (the area set by the trimming area setting operation so far) stored in the system memory 52, and record, in the recording medium 200, the trimmed image as the new image file, and then the processing is ended.

By the processing described above, the control described with reference to FIGS. 3A, 3B, 4A, and 4B can be realized. With this arrangement, the user separately uses two trimming setting methods to perform the operation for setting the desired area in the whole image as the trimming area more swiftly and more accurately.

In the above-described processing, within a predetermined time since the trimming area display mode is switched to the whole-image display mode, the amount of the movement of the trimming area in response to the operation of the arrow key 74 may be set smaller. More specifically, in step S507, when the trimming area display mode is switched to the whole-image display mode, the timer is started. When the arrow key 74 has been pressed within a predetermined time (e.g., approximately one second) since the timer had been started, the trimming area is moved by the amount corresponding to the minimum movement unit of the pixels same as the movement amount in the trimming area display mode (i.e., fine adjustment with a small movement of the trimming area). When the trimming area is moved by the amount corresponding to the minimum movement unit of the pixels in response to the arrow key 74 being pressed within the predetermined time, the timer is reset to start again. When the arrow key 74 is pressed again within the predetermined time (approximately one second) since the last movement, the trimming area is moved by the amount corresponding to the minimum movement unit of the pixels same as the movement amount in the trimming area display mode. After the trimming area display mode had been switched to the whole-image display mode, when the arrow key 74 has not been operated for more than the predetermined time, the processing proceeds to step S509 described above. In response to the arrow key 74 being pressed subsequently, the trimming area is moved by the amount corresponding to 1.5% of the number of pixels in the movement direction. With this arrangement, when the position of the trimming area is finely adjusted in the trimming area display mode, the user can continue the fine adjustment while confirming a state outside the trimming area by once switching the trimming area display mode to the whole-image display mode.

A second exemplary embodiment of the present invention will be described below. In the trimming area display mode described in the first exemplary embodiment, the image in which an inside of a periphery (boundary) of the trimming area is partially enlarged may be displayed at a time. The second exemplary embodiment will explain this case. Most parts of an external view and a block diagram of the apparatus, and a flowchart according to the second exemplary embodiment are similar to those of the first exemplary embodiment. Only differences from the first exemplary embodiment of the processing flow will be described below.

When the system control unit 50 determines the trimming area display mode is set (i.e., NO in step S508 illustrated in FIG. 5B), the system control unit 50 determines whether a detail confirmation button included in the operation unit 70 has been pressed. When the system control unit 50 determines that the detail confirmation button has been pressed, the control is performed in the detail display mode. When the system control unit 50 determines that the detail confirmation button has not been pressed, the processing proceeds to step S514 illustrated in FIG. 5B.

Figure 6:
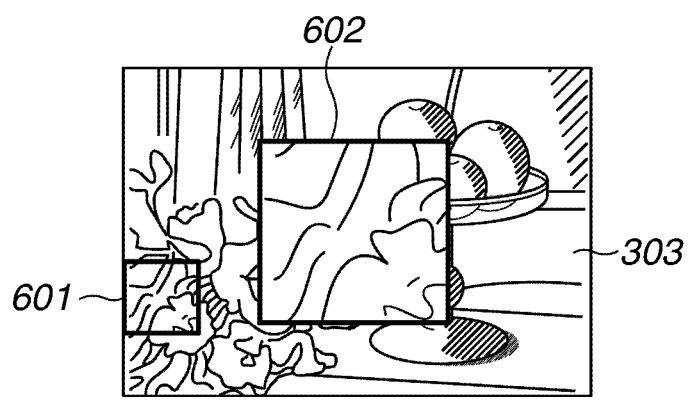
FIG. 6 illustrates a display example of a detail display mode.

FIG. 6 illustrates a display example of the detail display mode. When the system control unit 50 determines the trimming area display mode is set (i.e., NO in step S508 illustrated in FIG. 5B), if the detail confirmation button included in the operation unit 70 is pressed, images illustrated in FIG. 6 is displayed. An enlarged image 602 is obtained by enlarging a portion of a frame 601 set inside a peripheral portion of the partial image 303, which is the image inside the trimming area. By viewing the enlarged image 602, the user can confirm in detail whether the object to be included in the trimming area is included in a boundary portion thereof. The system control unit 50 moves the frame 601 in response to the arrow key 74 being pressed. In response to the frame 601 being moved, the enlarged image 602 is updated to the image indicating the area of the moved frame 601 enlarged. When the detail confirmation button is pressed during the detail display mode, the system control unit 50 ends the detail confirmation mode and returns to the normal trimming area display mode (the processing proceeds to step S514 illustrated in FIG. 5B). After the mode is returned to the trimming area display mode, the user can perform the fine adjustment based on the confirmation result in the detail display mode.

Figure 7A:
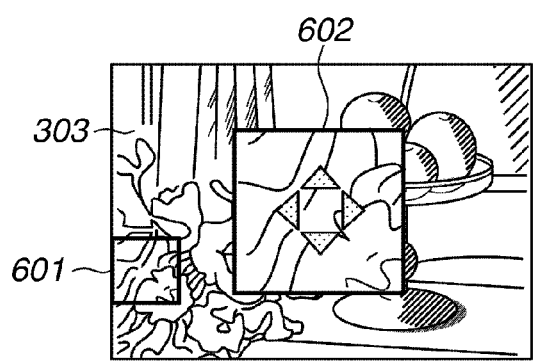
FIGS. 7A and 7B illustrate display examples of a trimming area fine adjustment mode in the detail display mode.
Figure 7B:
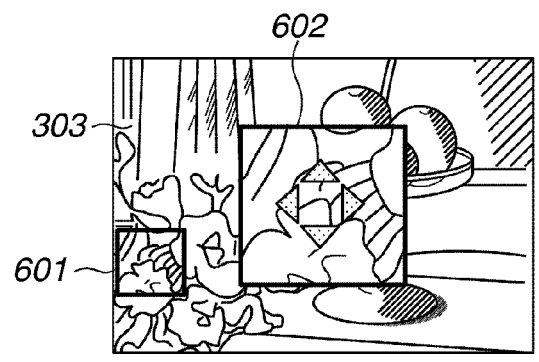
Figure 8:
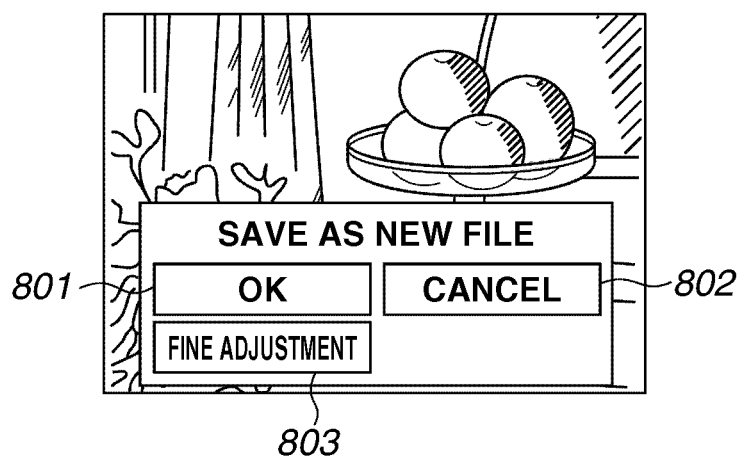
FIG. 8 illustrates a display example of a saving confirmation screen.

Further, when the set button 75 is pressed during the display in the detail display mode illustrated in FIG. 6, the system control unit 50 shifts to a trimming area fine-adjustment mode in the detail display mode. FIG. 7A illustrates a display example of the trimming area fine-adjustment mode in the detail display mode. In the trimming area fine-adjustment mode, the system control unit 50 moves the trimming area by a minimum movement unit in response to the arrow key 74 being pressed. For example, when the right button included in the arrow key 74 is pressed with the image illustrated in FIG. 7A displayed, a display area of the partial image 303 is moved (scrolled) right, and then the image illustrated in FIG. 7B is displayed. At this time, a position on the screen of the frame 601 is fixed. Since, in the enlarged image 602 illustrated in FIG. 7B, where the moved trimming area is displayed, an inside of the frame 601 after the trimming area is changed is enlarged and displayed, the user can confirm in detail whether the object to be included within the trimming area is properly included in the trimming area. When the set button 75 is pressed in the trimming area fine adjustment mode of the detail display mode, the system control unit 50 displays the saving confirmation screen on the display unit 28. FIG. 8 illustrates a display example of the saving confirmation screen. On the saving confirmation screen, the user operates the arrow key 74 to select any of an OK button 801, a cancel button 802, and a fine-adjustment button 803, and then press the set button 75 to determine the selection. When the system control unit 50 determines that the OK button 801 is selected and the set button 75 is pressed, the processing proceeds to step S523 illustrated in FIG. 5B to perform the trimming processing. When the system control unit 50 determines that the cancel button 802 is selected and the set button 75 is pressed, the processing returns to step S502 illustrated in FIG. 5A. When the system control unit 50 determines that the fine-adjustment button 803 is selected and the set button 75 is pressed, the mode shifts to the detail display mode illustrated in FIG. 6.

In each of the above-described exemplary embodiments, an example is described where a reduction ratio and an enlargement ratio of the trimming area when the enlargement button 77 and the reduction button 78 is pressed, respectively, does not vary between the whole-image display mode and the trimming area display mode. However, they may vary. For example, the reduction ratio of the trimming area when the enlargement button 77 is once pressed in the trimming area display mode is set smaller than that in the whole-image display mode. Further, the enlargement ratio of the trimming area when the reduction button 78 is once pressed in the trimming area display mode is set smaller than that in the whole-image display mode. More specifically, in response to one operation of changing the size of the trimming area in the whole-image display mode, the size of the trimming processing area is changed by a first change amount (first magnification ratio). On the other hand, in response to one operation of changing the size of the trimming area in the trimming area display mode, the size of the trimming processing area is changed by a second change amount (second magnification ratio) that is smaller than the first change amount. With this arrangement, in the whole-image display mode, the trimming area can be swiftly set according to a user's intention by the rough adjustment of the size of the trimming area. Further, in the trimming area display mode, the trimming area can be accurately set according to the user's intention by the fine adjustment. As described above, the whole-image display mode and the trimming area display mode are switched to be used so that the user can swiftly and accurately set the trimming area according to the user's intention.

In the above-described each exemplary embodiment, the method for setting the trimming area is described. However, in addition to the trimming, the present invention can be applied to any case where an area of the part of the image on which the processing is to be performed is set. For example, exemplary embodiments of the present invention include processing for changing the color tone of an area of the part of the image, processing for copying an area of the part thereof (the "copied" area means the same as the "trimmed" area), and processing for masking an area of the part thereof. However, like the trimming area display described above, according to the exemplary embodiments of the present invention, adjustment can be performed without displaying an outside the part of the area of the image, which is particularly effective for setting the trimming area.

According to the exemplary embodiments of the present invention described above, the methods for roughly specifying and finely specifying the processing area of the predetermined processing are combined to be used so that, although the processing area of the predetermined processing can be finely adjusted, the processing area of the predetermined processing can be set with less instructions. In other words, in the display state where the processing area of the predetermined processing is indicated with the whole image displayed, and in the display state where the enlarged processing area of the predetermined processing is displayed, the setting operation of the processing area of the predetermined processing can be performed with a desirable operation feeling according to each of the display state.

The various types of controls described above as to be performed by the system control unit 50 may be performed by one hardware, or a plurality of hardware devices each working on respective processing to control the entire apparatus.

The desirable exemplary embodiments of the present invention are described above. However, exemplary embodiments of the present invention are not limited to a specific exemplary embodiment, and include various types of embodiments made within the scope without departing the spirit of the invention. Further, the above-described exemplary embodiments only describe examples of exemplary embodiments of the present invention, and each of the exemplary embodiments can also be appropriately combined with each other.

In the above-described exemplary embodiments, a case where the present invention is applied to the digital camera 100 is described. However, it is not limited thereto and can be applied to any display control apparatus as long as the display control apparatus can display the screen for setting the trimming area in the image. More specifically, the present invention can be applied to a personal computer, a personal digital assistance (PDA), a terminal of a mobile phone, a mobile image viewer, a printer apparatus including a display, a digital photo frame, a music player, a game machine, and an electronic book reader.

In the above described exemplary embodiment, according to the operation (pressing) of the arrow key that is a hard key, the trimming area is moved. However, according to the operation of the arrow key (soft key) displayed on a display unit, the trimming area may be moved. In this case, when a touch panel detects that the arrow key has been touched, the operation (pressing) of the arrow key can be detected.

The exemplary embodiments of the present invention can also be realized by performing processing described below. More specifically, the processing can be performed when a software (program) realizing the functions of the above-described exemplary embodiments is supplied to the system or the apparatus via a network or various types of storage media, and then a computer (or central processing unit (CPU) or a micro-processor unit (MPU)) of the system or the apparatus reads a program code. In this case, a configuration according to an exemplary embodiment of the present invention includes a program and a non-transitory storage medium storing the program are included.

According to the exemplary embodiments of the present invention, in the display state where the processing area of the predetermined processing is indicated with the whole image displayed and in the display state where the enlarged processing area is displayed, the setting operation of the processing area of the predetermined processing can be performed with a desirable operation feeling according to each of the display state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-032107 filed Feb. 21, 2013, which is hereby incorporated by reference herein in its entirety.

What is claimed is:

1. A display control apparatus comprising:
a display control unit configured to display an image in a display region of a display unit in a first display mode for displaying a whole of the image in a state where a processing area of a part of the image is identifiable, and in a second display mode for displaying the processing area of the image zoomed according to the display region;
an operation unit configured to receive a predetermined changing operation for changing the processing area of the image; and
a control unit configured to move, in the first display mode, the processing area by a first movement amount in response to receiving the predetermined changing operation, and to move, in the second display mode, the processing area by a second movement amount that is smaller than the first movement amount in response to receiving the predetermined changing operation.

2. The display control apparatus according to claim 1, wherein, in the first display mode, the control unit is configured to move the processing area by the first movement amount in response to one operation of the predetermined changing operation, and to move, in the second display mode, the processing area by the second movement amount in response to the one operation of the predetermined changing operation.

3. The display control apparatus according to claim 1, wherein the control unit is configured to change, in the first display mode, a size of the processing area with a first magnification ratio in response to one operation for changing the size of the processing area as the predetermined changing operation, and to change, in the second display mode, the size of the processing area with a second magnification ratio that is smaller than the first magnification ratio in response to the one operation for changing the size of the processing area as the predetermined changing operation.

4. The display control apparatus according to claim 1, wherein the control unit is configured to move, in the second display mode, the processing area by a certain movement amount.

5. The display control apparatus according to claim 4,
wherein a minimum movement amount for moving the processing area is determined; and
wherein the control unit is configured to move, in the second display mode, the processing area by the minimum movement amount.

6. The display control apparatus according to claim 1, wherein the control unit is configured to move, in the first display mode, the processing area by a movement amount corresponding to a number of recording pixels of the image.

7. The display control apparatus according to claim 1, wherein the display control unit is configured not to display, in the second display mode, an outside portion of the processing area of the image.

8. The display control apparatus according to claim 1, wherein the predetermined processing is trimming.

9. The display control apparatus according to claim 1, further comprising a processing unit configured to perform the predetermined processing on the processing area set by the control unit.

10. The display control apparatus according to claim 1, wherein the operation unit is a button.

11. The display control apparatus according to claim 1, further comprising a switching unit configured to switch between the first display mode and the second display mode in response to a user's operation.

12. The display control apparatus according to claim 1, wherein the control unit is configured to change, if the changing operation is performed within a predetermined time since the second display mode has been switched to the first display mode, the processing area by the second change amount.

13. The display control apparatus according to claim 1, wherein the display control unit is configured to enlarge and display, in the second display mode, a part of an inside of a boundary of the processing area in response to a user's operation.

14. A display control apparatus comprising:
a display control unit configured to display an image in a display region of a display unit in a first display mode for displaying a whole of the image in a state where a processing area of a part of the image is identifiable, and in a second display mode for displaying the processing area of the image zoomed according to the display region; and
an operation unit including a direction key for issuing an instruction to move the processing area in a predetermined direction; and
a control unit configured to move the processing area in response to the direction key being operated,
wherein the control unit is configured to move, in the first display mode, the processing area by a first movement amount in response to the direction key being operated, and to move, in the second display mode, the processing area by a second movement amount that is smaller than the first movement amount in response to the direction key being operated.

15. The display control apparatus according to claim 14, wherein the direction key is capable of issuing an instruction to move the processing area in each of a plurality of directions; and
wherein the control unit is configured to move the processing area in a direction instructed by the direction key.

16. The display control apparatus according to claim 14, wherein the direction key is an arrow key.

17. The display control apparatus according to claim 14, wherein the direction key is a press button.

18. The display control apparatus according to claim 14, wherein the control unit is configured to move, in the second display mode, if the direction key is operated for a predetermined time, the processing area by a third movement amount that is larger than the second movement amount.

19. The display control apparatus according to claim 18, wherein the control unit is configured to move, in the second display mode, even if the direction key is operated for the predetermined time, the processing area by the first movement amount.

20. The display control apparatus according to claim 18, wherein the third movement amount is smaller than the first movement amount.

21. A method for controlling a display control apparatus, the method comprising:
displaying in a display region of a display unit, in a first display mode, a whole of an image in a state where an area of a part of the image, the area being a processing area of predetermined processing, is identifiable, and displaying, in a second display mode, the processing area of the image zoomed according to the display region;
moving the processing area in response to receiving a predetermined changing operation from a user; and
moving, in the first display mode, the processing area by a first movement amount in response to receiving the predetermined changing operation and moving, in the second display mode, the processing area by a second movement amount that is smaller than the first movement amount in response to receiving the predetermined changing operation.

22. A method for controlling a display control apparatus, the method comprising:
displaying in a display region of a display unit, in a first display mode, a whole of an image in a state where an area of a part of the image, the area being a processing area of predetermined processing, is identifiable, and displaying, in a second display mode, the processing area of the image zoomed according to the display region;
moving the processing area in response to a direction key for issuing an instruction to move the processing area in a predetermined direction being operated; and
moving, in the first display mode, the processing area by a first movement amount in response to the direction key being operated, and moving, in the second display mode, the processing area by a second movement amount that is smaller than the first movement amount in response to the direction key being operated.

23. A non-transitory computer-readable storage medium storing a program that causes a computer to function as each unit of the display control apparatus according to claim 1.

24. A non-transitory computer-readable storage medium storing a program that causes a computer to function as each unit of the display control apparatus according to claim 14.

* * * * *